United States Patent
Lin et al.

(10) Patent No.: US 12,412,010 B1
(45) Date of Patent: Sep. 9, 2025

(54) METHOD FOR CONSTRUCTING DIGITAL TWIN SYSTEM FOR ADDITIVE MANUFACTURING PROCESS WITH LIFECYCLE DATA MANAGEMENT

(71) Applicant: WUHAN UNIVERSITY OF SCIENCE AND TECHNOLOGY, Wuhan (CN)

(72) Inventors: Xin Lin, Wuhan (CN); Kunpeng Zhu, Wuhan (CN); Haihong Zhu, Wuhan (CN); Xinyuan Chen, Wuhan (CN); Haodong Chen, Wuhan (CN); Tianwang Ye, Wuhan (CN)

(73) Assignee: WUHAN UNIVERSITY OF SCIENCE AND TECHNOLOGY, Hubei (CN)

( * ) Notice: Subject to any disclaimer, the term of this patent is extended or adjusted under 35 U.S.C. 154(b) by 0 days.

(21) Appl. No.: 19/013,044

(22) Filed: Jan. 8, 2025

(30) Foreign Application Priority Data

Jun. 3, 2024 (CN) .......................... 202410708840.7

(51) Int. Cl.
*G06F 30/27* (2020.01)
*G06F 113/10* (2020.01)
*G06F 119/18* (2020.01)

(52) U.S. Cl.
CPC .......... *G06F 30/27* (2020.01); *G06F 2113/10* (2020.01); *G06F 2119/18* (2020.01)

(58) Field of Classification Search
CPC ... G06F 30/27; G06F 2119/18; G06F 2113/10
See application file for complete search history.

(56) References Cited

FOREIGN PATENT DOCUMENTS

| | | | |
|---|---|---|---|
| CN | 114372725 A | 4/2022 | |
| CN | 114564880 A | 5/2022 | |
| CN | 115489125 A | 12/2022 | |
| CN | 117875120 A | 4/2024 | |
| WO | 2019055576 A | 3/2019 | |
| WO | WO-2023038844 A1 * | 3/2023 | ............. B22F 10/28 |

OTHER PUBLICATIONS

Yangkun Mao et al, Melt Pool and Spatter Monitoring in Selective Laser Melting Forming Process Based on Target Detection, Journal, 2023, pp. 0335-0348, issue. 9, Journal of Mechanical Engineering, Chian.

Xianyin Duan et al, Digtal twin-driven on-line monitoring method or metal selective laser melting buulding process, Journal, Feb. 2021, vol. 21 issue. 2.

* cited by examiner

*Primary Examiner* — Bijan Mapar
(74) *Attorney, Agent, or Firm* — Ming Jiang; OPENPTO US LLC

(57) ABSTRACT

The present invention relates to a method for constructing a digital twin system for an additive manufacturing process with lifecycle data management. The digital twin system for an additive manufacturing process constructed by the method includes a data acquisition and supervisory control system, a data management and storage system, a manufacturing executing system, a configuration model, a simulation system, and a multi-physics simulation system. The present invention can fully and accurately characterize the molding quality of parts, thereby saving a lot of time required for offline data processing, and achieving real-time acquisition and updating of data.

10 Claims, 4 Drawing Sheets

METHOD FOR CONSTRUCTING DIGITAL TWIN SYSTEM FOR ADDITIVE MANUFACTURING PROCESS WITH LIFECYCLE DATA MANAGEMENT

CROSS-REFERENCE TO RELATED APPLICATIONS

The present application claims priority benefits to Chinese Patent Application No. 202410708840.7 filed on Jun. 3, 2024, the disclosure of which is incorporated herein by reference in its entirety.

TECHNICAL FIELD

The present invention relates to the technical field of additive manufacturing, and in particular to a method for constructing a digital twin system for an additive manufacturing process with lifecycle data management.

BACKGROUND

An additive manufacturing technology is a manufacturing mode relative to subtractive manufacturing, and a metal additive manufacturing technology is currently one of the most promising additive manufacturing technologies. However, due to the characteristics of metals such as high melting points and complex phase changes, it is difficult to precisely control the molding quality of parts during a metal additive manufacturing process, which hinders the development of the metal additive manufacturing technology.

Currently, intelligent regulation and control combined with experiment is widely used for regulating and controlling the molding quality of the parts, thereby linking experimental data from online monitoring with defects and establishing a mapping relationship with process parameters. Finally, through real-time monitoring, decisions are made to regulate and control the originally set process parameters of additive manufacturing equipment. For certain defects that are difficult to observe in experiment, a simulation means is taken to perform offline simulation to obtain optimal parameters, thereby reducing corresponding defects.

However, monitoring or simulation data during a molding process only characterizes processing features of a certain molding layer, and offline lifecycle data can characterize final properties of additive manufactured parts. The massive lifecycle data processing greatly increases the manufacturing cost and cannot meet real-time processing requirements for the additive manufacturing process. The lifecycle includes material-equipment-molded, parts-process, parameter packages-macro, properties-micro, and properties-performance prediction.

The Chinese patent with a Publication No. CN114564880A discloses a method for constructing a digital twin module for an additive manufacturing process, a digital twin of an additive manufacturing physical process is established by acquiring dimensional information of a molten pool, and forward prediction and inverse prediction are performed on the process parameters and the dimensions of the molten pool through a machine learning model to realize virtual-real fusion and data intercommunication of an additive manufacturing physical entity without the digital twin, and finally, the intelligent regulation and control on molding quality of the parts during the additive manufacturing process are realized. However, because acquired signals are single, the molding quality of the parts cannot be accurately characterized, and the acquired experimental data cannot reveal the root causes of the defects, the method for constructing a digital twin module for an additive manufacturing process still has greater limitations in regulating and controlling the molding quality of the parts.

Therefore, a digital twin system that can accurately regulate and control the quality of the molded parts, overcome the uncertainty of a single regulation and control model, and consist of modules such as a multi-source signal fusion module, a defect prediction module based on deep learning network, and a multi-physics simulation module, has not yet emerged.

SUMMARY

In view of the deficiencies of the prior art, the present invention provides a method for constructing a digital twin system for an additive manufacturing process with lifecycle data management, which provides a new way for regulation and control on additive manufacturing quality, and establishes a digital twin system with lifecycle data management, thereby realizing direct regulation and control from materials to performance, and improving the quality and manufacturing efficiency of additive manufactured products. The lifecycle includes material-equipment-molded, parts-process parameter, packages-macro properties-micro, properties-performance prediction.

In order to realize the purpose, that present invention designs a method for constructing a digital twin system for an additive manufacturing process with lifecycle data management, including the following steps:

S1: constructing a data acquisition and supervisory control system (DASCS), performing acquisition through a multi-source sensor to obtain real-time manufacturing process data of additive manufacturing and processing equipment, and obtaining actual feature signals and a mapping relationship between the process parameters and the real-time manufacturing process data through a deep learning network unit;

S2: constructing a defect prediction model by using an existing historical process parameter defect library and performing data coupling on the mapping relationship, the actual feature signals and simulation feature signals, thereby forming a data management and storage system (DMSS), where the defect prediction model makes a decision on the basis of anomalies between historical data in the historical process parameter defect library and the real-time manufacturing process data, and outputting control parameters corresponding to the decision to a manufacturing executing system (MES);

S3: constructing the manufacturing executing system (MES) for the additive manufacturing and processing equipment, where the manufacturing executing system (MES) executes corresponding action instructions according to the control parameters to perform additive manufacturing, and providing a feedback that the control parameters has been executed to the data management and storage system (DMSS);

S4: on the basis of the manufacturing executing system (MES), establishing a digital model as a mapping model for the manufacturing executing system, and setting a configuration model (CM), which is used for configuring parameters for the digital model by referring to the manufacturing executing system (MES);

S5: constructing a simulation system (SS), performing an intra-module simulation and an inter-module simulation on the basis of the data from the data management and storage system (DMSS) formed in the step S2, evaluating simulation results, and providing simulation requirements;

S6: on the basis of the simulation requirements raised by the simulation system (SS), constructing a multi-physics simulation system (MSS), which is used for simulating manufacturing processes, such as a nucleation process, a growth process, a phase change process, a texture formation process, a deformation process, a cracking process, a melting process, a process of changes in a temperature field cooling rate, a process of changes in morphology and texture, a process of changes in intensity stress, and a process of changes in residual stress; and S7: on the basis of the simulation results obtained from the step S6, obtaining quality and performance situations of additive manufactured and processed parts under different process parameters and material properties, and simulation feature signals corresponding to the quality and performance situations, and feeding the simulation feature signals back to the data acquisition and supervisory control system (DASCS) in the step S1 to form a system loop.

As a preferred scheme, in the step S1, the multi-source sensor includes an optical microphone, a radiography camera, a high-speed camera, and a spectrometer, and the real-time manufacturing process data includes ultrasonic signals of cracks, spatter images for a molten pool, and a melt track temperature.

As a preferred scheme, in the step S1, the actual feature signals include appearance time and appearance frequency features of the ultrasonic signals of cracks, spatter angle and speed features of the molten pool, and the maximum value and distribution features of the melt track temperature. In the step S2, the simulation feature signals are derived from the multi-physics simulation system (MSS), including microstructure features, temperature features, internal pore features, residual stress features, etc.

As a preferred scheme, the extracted actual feature signals and corresponding process parameters are inputted into an optimized deep learning network unit, i.e., a LeNet-5 network, to obtain the mapping relationship between the real-time manufacturing process data acquired by the multi-source sensor and the process parameters, and an intrinsic connection of the real-time manufacturing process data, the mapping relationship and the intrinsic connection are used as a data basis for the defect prediction model.

An optimization process for the LeNet-5 network includes:
1) adding a Based model benchmark network structure;
2) replacing a standard convolution in the sixth convolutional layer with a depthwise separable convolution;
3) using average pooling instead of a fully connected layer;
4) adding a batch normalization layer before an activation function of each convolutional layer; and
5) adding L2 regularization and Dropout terms to the fully connected layer.

As a preferred scheme, in the step S2, a physical manufacturing system and a virtual manufacturing system achieve bi-directional data flow within the data management and storage system (DMSS); and a communication unit achieves data connection between the data acquisition and supervisory control system (DASCS) and the multi-physics simulation system (MSS) through a multi-interface protocol, and mirrors a physical unit consisting of multiple sensors in additive manufacturing to a cloud; and the cloud manages and synchronizes timeline information of a data space and a physical space to ensure the simulation accuracy of physical information during synchronization and running.

As a preferred scheme, in the step S3, after the manufacturing executing system (MES) executes the instructions, the corresponding control parameters are fed back to the data management and storage system (DMSS), and uploaded to a cloud server, and the historical process parameter defect library is updated in real time.

As a preferred scheme, in the step S4, the digital model in the configuration model (CM) includes a powder bed model, a scraper model, a laser model, a blowing and atmospheric circulation model.

As a preferred scheme, in the step S5, the intra-module simulation is temperature field simulation, and the inter-module simulation is stress field simulation and phase field simulation.

As a preferred scheme, in the step S6, input parameters used by the multi-physics simulation system (MSS) during simulation of the same batch are the same process parameters and material properties.

As a preferred scheme, in the step S2, data coupling is achieved through a VRFT parameter update algorithm, which is:

$$x_{k+1}=x_k+f(x_k,u_k+v_k)\cdot T;$$

where $x_{k+1}$ represents an intermediate predicted value of simulation feature signals at step k+1, $x_k$ represents a state vector of the actual feature signals at step k, f( ) represents a computational fluid dynamics model, a fluid-solid coupling model and a phase field model of the multi-physics simulation system (MSS), $u_k$ represents a control variable of the process parameters at step k, $v_k$ represents a feature signal at step k, and T represents a sampling period;

$$y_{k+1}=n_{k+1}+h(x_{k+1},f(x_k,u_k+v_k)\cdot T);$$

wherein $y_{k+1}$ represents a predicted value, $n_{k+1}$ represents a measurement feature signal at step k+1, and h( ) represents a data learning model.

Compared with the prior art, according to the present invention, in order to accurately regulate and control the quality of the molded parts and overcome the uncertainty of the single regulation and control model, a complete digital twin system consisting of modules such as a multi-source signal fusion module, a defect prediction module based on deep learning network and the multi-physics simulation system is established, and a multi-scale lifecycle multi-module digital intercommunication intelligent quality control system is realized, thereby improving the quality of the additive manufactured products and manufacturing efficiency, and promoting development of the additive manufacturing technology. The lifecycle includes material-equipment-molded, parts-process parameter, packages-macro properties-micro, properties-performance prediction.

Compared with the prior art, the present invention has the following beneficial effects:
1) combining online monitoring data and simulation data, the limitations, in the additive manufacturing process, of poor real-time capability for offline processing of lifecycle data, the inability of a physical manufacturing system to explain the root causes of defects, the inability of a virtual system to capture uncertainties, etc., are broken through, and the molding quality of parts can be completely and accurately characterized.
2) Using the digital twin system with the lifecycle data management of the present invention avoids a large amount of time that needs to be spent on offline data processing, and realizes the real-time acquisition and real-time update of the data.

3) A complete bi-directional flow of virtual data and experimental data is realized, and the digital twin of the additive manufacturing process is constantly updated to realize self-improvement of the accuracy of the digital twin system.

DETAILED DESCRIPTION OF THE EMBODIMENTS

To explain technical problems to be solved by the present invention, the technical solutions adopted and technical effects achieved by the present invention more clearly, the technical solutions of the present invention will be further described below in conjunction with the accompanying drawings and by means of specific embodiments. It should be understood that the specific embodiments described herein are merely intended to explain the present invention, rather than to limit the present invention. It should also be noted that, for convenience of description, only the parts related to the present invention are shown in the accompany drawings.

In the description of the present invention, it should be noted that, the orientations or positional relationships indicated by the terms "center", "up", "down", "left", "right", "vertical", "horizontal", "inside", "outside", etc. are based on those shown in the accompanying drawings, intended only for the convenience of describing the present invention and for simplifying the description, and not intended to indicate or imply that the referred apparatus or element must be provided with a particular orientation or constructed and operated with a particular orientation, therefore not allowed to be construed as a limitation of the present invention. Furthermore, the terms "first" and "second" are intended only for descriptive purposes and should not be construed as indication or implication of relative importance. The terms "first position" and "second position" are two different positions.

In the description of the present invention, it is to be noted that, unless otherwise expressly specified and limited, the terms "mounted", "connected with", "connected to" are to be understood in a broad sense, e.g. as a fixed connection or a removable connection; as a mechanical connection or an electrical connection; as a direct connection or an indirect connection via an intermediate medium; and as a connection within two elements. For those of ordinary skill in the art, the specific meanings of the above terms herein can be understood on a case-by-case basis.

Figure 1:
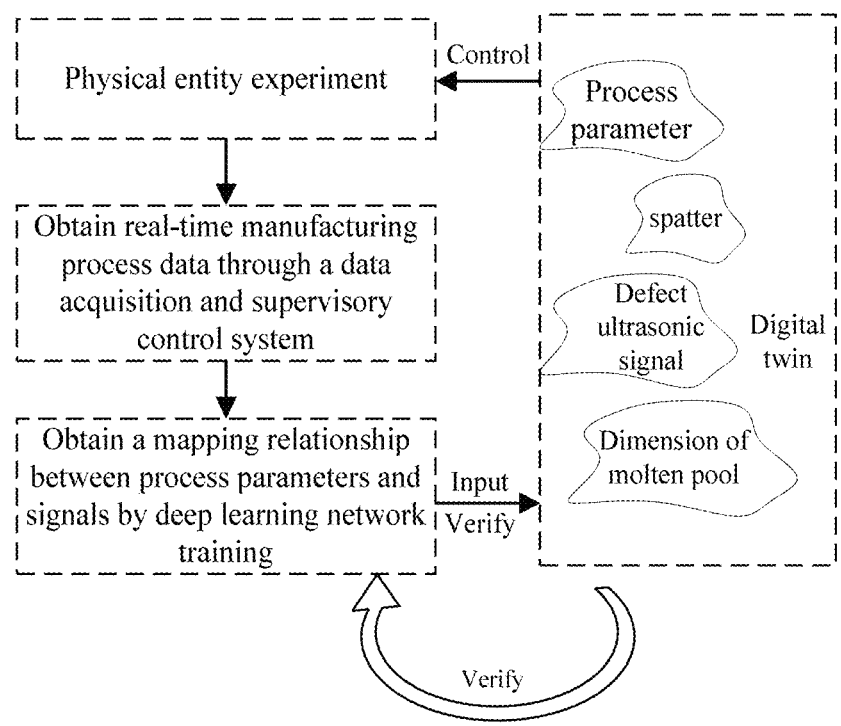
FIG. 1 shows a block diagram of implementation of a digital twin system for an additive manufacturing process.

A digital twin system for an additive manufacturing process includes a physical manufacturing system and a virtual manufacturing system, where the physical manufacturing system includes additive manufacturing and processing equipment, multi-source sensing and multi-physics monitoring equipment, data acquisition equipment and communication equipment. As shown in FIG. 1, a system realization process is as follows.

Step 10: performing additive manufacturing physical entity experiment, using 3 high-speed cameras to acquire images and spatter information for a molten pool from different angles, using a colorimetric pyrometer to acquire molten pool temperature, and using an optical microphone to acquire ultrasonic signals of the defects;

Step 20: obtaining real-time manufacturing process data through a data acquisition and supervisory control system, and using a multifunctional acquisition card to acquire melt track image feature information, molten pool temperature information and the ultrasonic signals of the defects for processing and extracting features;

Step 30: through a deep learning network, obtaining a mapping relationship between process parameters and data acquired by a sensor, as well as an intrinsic connection between multi-source signals, as a data basis for a digital twin;

Step 40: continuing to input experimental data to the digital twin through the deep learning network to verify the accuracy of the digital twin, and the digital twin feeding data back to the deep learning network to improve the accuracy of the network; and Step 50: by comparing the real-time experimental data with the digital twin, making a decision in real time, outputting control parameters, correcting the physical manufacturing system, and realizing effective regulation and control on the additive manufacturing molding quality.

In order to solve the problems that a physical manufacturing system (including a mechanistic model) cannot reveal the root causes of defects, virtual systems (including a simulation model) cannot capture uncertainties, and defects cannot be accurately controlled and eliminated through regulation and control by a single system in lifecycle data during the additive manufacturing process, the present invention provides the method for constructing a digital twin system for an additive manufacturing process with lifecycle data management.

Figure 2:
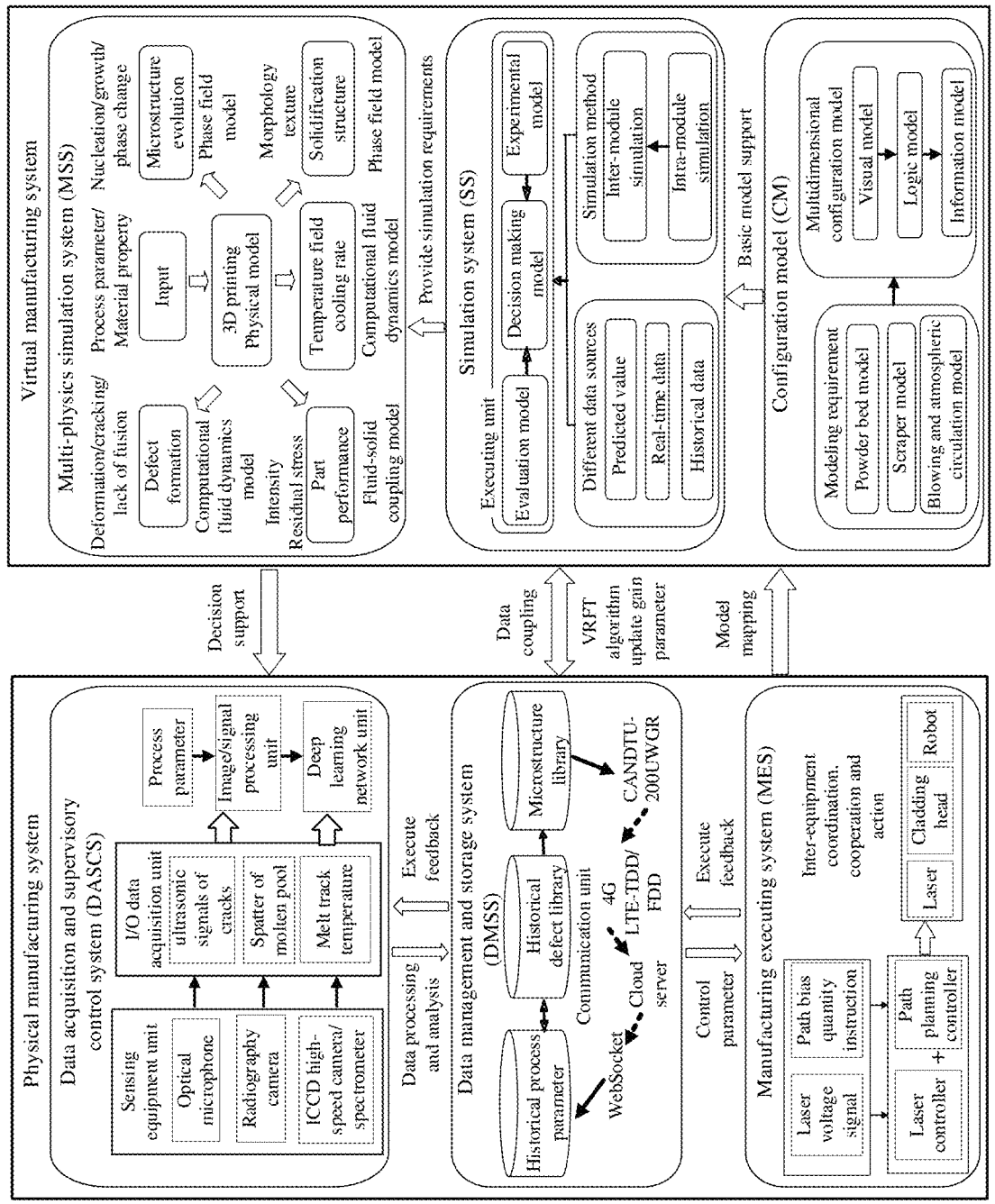
FIG. 2 shows a schematic diagram of a method for constructing a digital twin system for an additive manufacturing process with lifecycle data management.

As shown in FIG. 2, the digital twin system for the additive manufacturing process with lifecycle data management, provided in the present invention, includes a physical manufacturing system and a virtual manufacturing system, where the physical manufacturing system includes a data acquisition and supervisory control system (DASCS), a data management and storage system (DMSS), and a manufacturing executing system (MES), and the virtual manufacturing system includes a configuration model (CM), a simulation system (SS) and a multi-physics simulation system (MSS).

The method for constructing a digital twin system for an additive manufacturing process with lifecycle data management provided in the present invention includes the following steps:

S1: constructing a data acquisition and supervisory control system (DASCS), performing acquisition through a multi-source sensor to obtain real-time manufacturing process data of additive manufacturing and processing equipment, and obtaining actual feature signals and a mapping relationship between the process parameters and the real-time manufacturing process data through a deep learning network unit;

S2: constructing a defect prediction model by using an existing historical process parameter defect library and performing data coupling on the mapping relationship, the actual feature signals and simulation feature signals, thereby forming a data management and storage system (DMSS), where the defect prediction model makes a decision on the basis of anomalies between historical data in the historical process parameter defect library and the real-time manufacturing process data, and outputting control parameters corresponding to the decision to a manufacturing executing system (MES);

S3: constructing the manufacturing executing system (MES) for the additive manufacturing and processing equipment, where the manufacturing executing system (MES) executes corresponding action instructions according to the control parameters to perform additive manufacturing, and providing a feedback that the control parameters has been executed to the data management and storage system (DMSS);

S4: establishing, on the basis of the manufacturing executing system (MES), a digital model as a mapping model for the manufacturing executing system, and setting a configuration model (CM), which is used for configuring parameters for the digital model by referring to the manufacturing executing system (MES);

S5: constructing a simulation system (SS), performing an intra-module simulation and an inter-module simulation on the basis of the data from the data management and storage system (DMSS) formed in the step S2, evaluating simulation results, and providing simulation requirements;

S6: on the basis of the simulation requirements raised by the simulation system (SS), constructing a multi-physics simulation system (MSS), which is used for simulating processes, such as a nucleation process, a growth process, a phase change process, a texture formation process, a deformation process, a cracking process, a melting process, a process of changes in a temperature field cooling rate, a process of changes in morphology and texture, a process of changes in intensity stress, and a process of changes in residual stress; and S7: on the basis of the simulation results obtained from the step S6, obtaining quality and performance situations of additive manufactured and processed parts under different process parameters and material properties, and simulation feature signals corresponding to the quality and performance situations, and feeding the simulation feature signals back to the data acquisition and supervisory control system (DASCS) in the step S1 to form a system loop.

In the embodiment, the additive manufacturing and processing equipment is selective laser melting equipment, and the data acquisition equipment is a multifunctional data acquisition card. The multi-source sensing and multi-physics monitoring equipment includes three industrial cameras, one acoustic emission equipment and one colorimetric pyrometer.

In the step S1, the multi-source sensor includes an optical microphone, a radiography camera, high-speed cameras, a spectrometer, and a colorimetric pyrometer. When the additive manufacturing experiment is performed, the three high-speed cameras, the radiography camera and the spectrometer are used to acquire images and spatter information for the molten pool from different angles, the colorimetric pyrometer is used to acquire the molten pool temperature, and the optical microphone is used to acquire the ultrasonic signals of the defects. The real-time manufacturing process data includes ultrasonic signals of cracks, spatter images for the molten pool, and melt track temperature. The image/signal processing unit can process initial signals or images acquired by the multi-source sensor to facilitate subsequent processing, such as denoising sound signals, and binarizing the images.

In the step S1, the process parameters are the process parameters of the corresponding materials recommended in an instruction manual of the additive manufacturing equipment.

In the step S1, the actual feature signals include appearance time and appearance frequency features of the ultrasonic signals of cracks, spatter angle and speed features of the molten pool, and the maximum value and distribution features of the melt track temperature. In the step S2, the simulation feature signals are derived from the multi-physics simulation system (MSS), including microstructure features, temperature features, internal pore features, residual stress features, etc.

Appearance frequency features of the ultrasonic signals of cracks are identified by a wavelet analysis method based on microstructures and acoustic emission signal patterns, and time-frequency signals are analyzed by CWT and DWT to obtain different frequency feature components.

Specifically, spatter angle feature information for the molten pool is extracted by using the following steps:
1) performing image enhancement on acquired spatter images, with an image enhancement technique being specifically histogram equalization;
2) removing salt-and-pepper noise that can interfere with image segmentation by a median filter;
3) segmenting a region of interest by a thresholding method; and
4) on the basis of the extracted spatter information, calculating features such as the spatter angle.

The extracted actual feature signals and corresponding process parameters are inputted into an optimized LeNet-5 network (i.e., a deep learning network unit), to obtain the mapping relationship between the real-time manufacturing process data acquired by the multi-source sensor and the process parameters, and an intrinsic connection of the real-time manufacturing process data. The mapping relationship and the intrinsic connection are used as a data basis for the defect prediction model.

An optimization process for the LeNet-5 network includes:
1) adding a Based model benchmark network structure;
2) replacing a standard convolution in the sixth convolutional layer with a depthwise separable convolution;
3) using average pooling instead of a fully connected layer;
4) adding a batch normalization layer before an activation function of each convolutional layer; and
5) adding L2 regularization and Dropout terms to the fully connected layer.

In the step S2, the data management and storage system (DMSS) includes a historical process parameter defect library, a microstructure library, a cloud server, and a communication unit, and the existing historical process parameter defect library is a data packet of the process parameters and corresponding defects of the corresponding material recommended in the instruction manual of the additive manufacturing and processing equipment.

In the step S2, the historical process parameter defect library includes a historical process parameter and a defect type corresponding to the historical process parameter. For example, the defect type is melt track discontinuity, melt track necking, and melt track edge protrusion.

Figure 3:
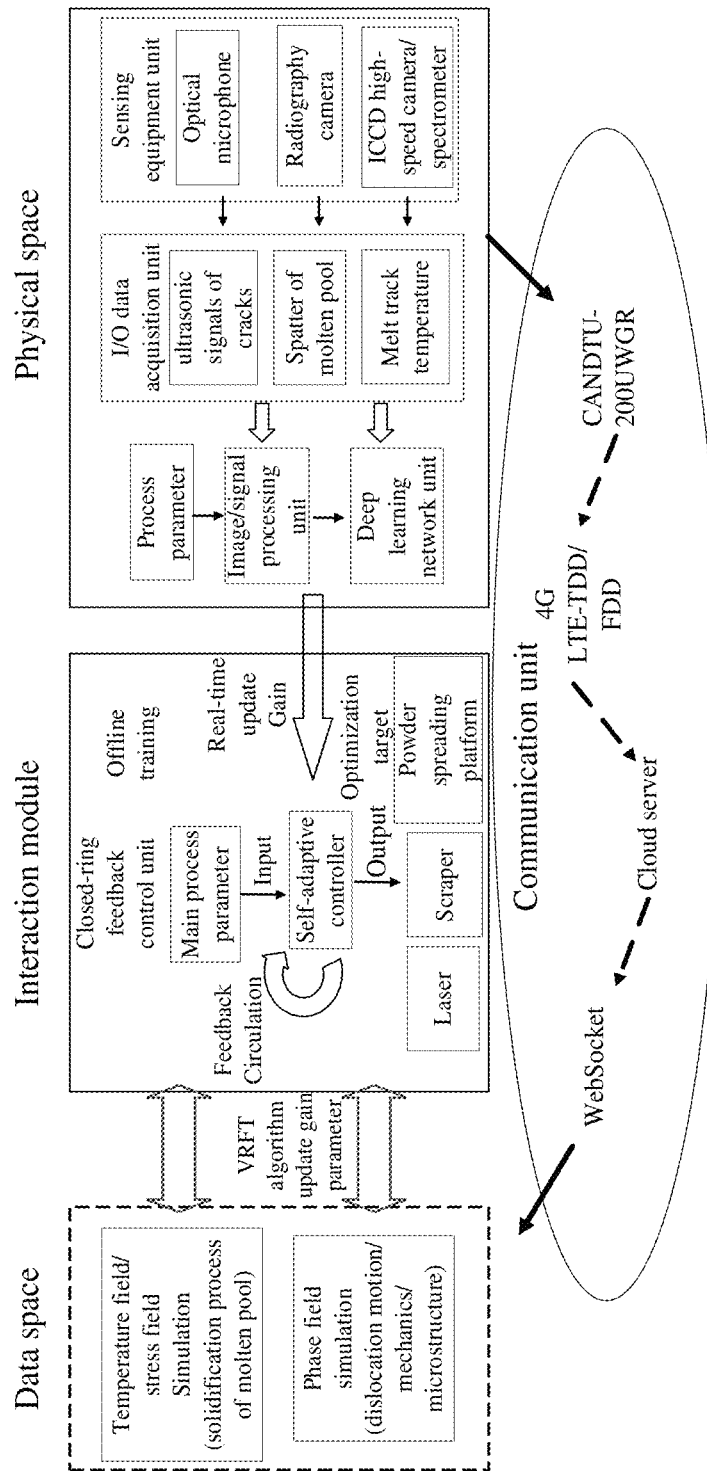
FIG. 3 shows a schematic diagram of a method for realizing bi-directional flow between a physical space and a virtual space of a digital twin system in the present invention.

Bi-directional flow between the physical space and the virtual space of the digital twin system is achieved between the data management and storage system (DMSS) and the simulation system (SS). Referring to FIG. 3, a realization method is specifically as follows. The communication unit achieves data connection between the physical unit and a simulation unit through a multi-interface protocol. The physical unit consisting of multiple sensors for additive manufacturing is imaged to the cloud. GrapeServer software (CPS system) of the cloud is used for managing and synchronizing the timeline information of the data space and the physical space to ensure the accuracy of simulation of physical information during synchronization and running.

In the steps S2 and S3, a decision is made on the basis of anomalies in the historical data and real-time manufacturing process data, and the manufacturing executing system (MES) adjusts the parameters of the controller and the sensor to execute the relevant action instructions. That is, the defect prediction model can obtain a defect type on the basis of the anomalies between the historical data in the historical process parameter defect library and the real-time manufacturing process data, perform mapping on the basis of the defect type to obtain correction quantity of the corresponding process parameters, and generate control parameters on the basis of the correction quantity of the process parameters so as to control units, such as a controller and a sensor, etc., in the manufacturing executing system (MES) to execute the corresponding actions, thereby adjusting the process parameters. For example, the control parameters are a laser voltage, a galvanometer deflection angle, a galvanometer deflection target value, and a galvanometer deflection speed.

Further, after the manufacturing executing system executes the instruction, the corresponding control parameters are fed back to the data management and storage system (DMSS) and uploads the control parameters to the cloud to update the historical process parameter defect library in real time.

Further, after the manufacturing executing system executes the instruction, the corresponding control parameters are fed back to the data management and storage system (DMSS), and focusing positions of the industrial cameras and the colorimetric pyrometer are changed on the basis of the control parameters, so as to realize the function of real-time data acquisition.

In the step S4, for the physical manufacturing system of the additive manufacturing and processing equipment, a digital model is established as a mapping model of the manufacturing executing system. The configuration model (CM) configures parameters for the digital model with reference to the manufacturing executing system.

Preferably, the configuration model (CM) establishes a visual model for a powder bed, a scraper, and a blowing and atmospheric circulation system in the physical manufacturing system, and establishes a logic model and an information transfer model therebetween.

In the step S5, the simulation system (SS) performs intra-module simulation and inter-module simulation on the basis of the data from the data management and storage system (DMSS) in the step S2, evaluates simulation results, and provides simulation requirements. Specifically, the intra-module simulation is temperature field simulation, and the inter-module simulation is stress field simulation and phase field simulation. The simulation results are evaluated to obtain defects produced, and the multi-physics simulation system (MSS) are required to simulate the process in which the defects are produced.

In the step S2, the mapping relationship, the actual feature signals and the simulation feature signals, which are outputted by the data acquisition and supervisory control system (DASCS), are subjected to data coupling, so as to construct the defect prediction model.

Figure 4:
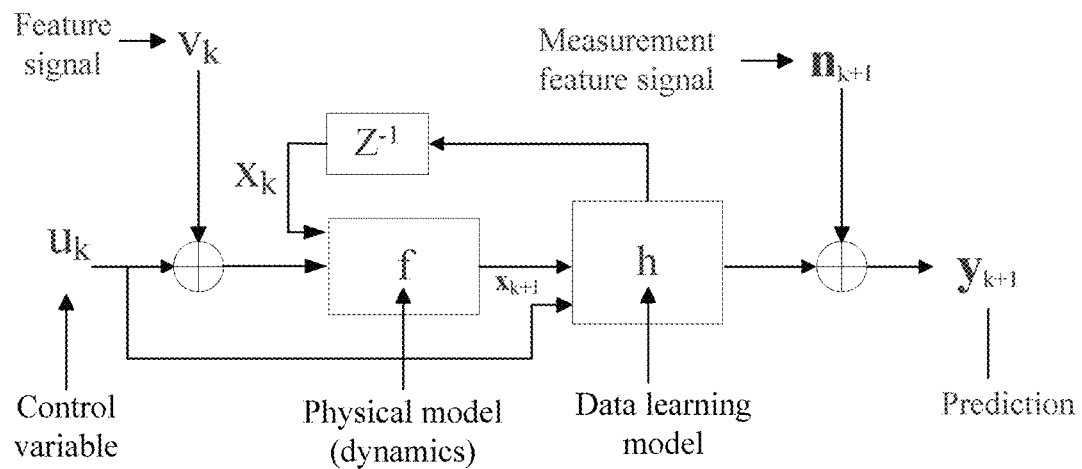
FIG. 4 shows a control block diagram for data coupling via a VRFT parameter update algorithm in the present invention.

FIG. 4 shows a control block diagram for data coupling via a VRFT parameter update algorithm. For each time or each sampling period T, a data learning model h is used to explore the intrinsic correlation with internal learning signals so as to predict the dimension of the molten pool, a precipitation type and distribution, etc. A physical model f is used to calculate the spatter angle, the molten pool temperature, the crack distribution, the microstructure and dislocation dynamics motion behaviors, etc., to establish a linkage between process features extracted from sensor data and the predicted values $y_{k+1}$. The process features include lack of fusion, residual stresses, cracks, columnar crystals, and other features.

The process of the VRFT parameter update algorithm is as follows:

$$x_{k+1}=x_K+f(x_k,u_k+v_k)\cdot T$$

wherein $x_{k+1}$ represents an intermediate predicted value of the simulation feature signals at step k+1, such as the lack of fusion, residual stresses, cracks, and columnar crystals. $x_k$ represents a state vector of the actual feature signals at step k, such as lack of fusion, residual stresses, cracks and columnar crystals, f( ) represents a computational fluid dynamics model, a fluid-solid coupling model, and a phase field model of the multi-physics simulation system (MSS), $u_k$ represents a control variable of the process parameters at step k, and $v_k$ represents the feature signals at step k and T represents a sampling period. The feature signals include the appearance time and appearance frequency features of the ultrasonic signals of cracks, the spatter angle and speed features of the molten pool, and the maximum value and distribution features of the melt track temperature, which are obtained in step S1.

$$y_{k+1}=n_{k+1}+h(x_{k+1},f(x_k,u_k+v_k)\cdot T)$$

wherein $n_{k+1}$ represents measurement feature signals acquired by the data acquisition and supervisory control system (DASCS) at step k+1, and h( ) represents a data learning model.

In the step S6, on the basis of the simulation requirements provided in the simulation system (SS), the multi-physics simulation system (MSS) call simulation modules, such as a microstructure evolution simulation module, a defect formation simulation module, a temperature field cooling simulation module, a solidification structure simulation module, a part performance simulation module, etc., and input the process parameters and material properties to simulate a nucleation/growth/phase change/texture formation process, a deformation/cracking/melting process, a process of changes in a temperature field cooling rate, a process of changes in morphology and texture, and a process of changes in intensity/residual stress, etc., respectively.

Specifically, the multi-physics simulation system include a temperature field, a stress field, a flow field, and a phase field.

Preferably, the temperature field, the stress field and the flow field are simulated using Flow 3d software in combination with Ansys software, and the phase field is simulated using the Flow 3d software in combination with Matlab software.

In the embodiment, a multi-physics simulation model is the prior art and will not be described.

In the step S7, on the basis of the simulation results obtained in the step S6, quality and performance situations of additive manufactured and processed parts under different process parameters and material properties and simulation feature signals corresponding to the quality and performance situations are obtained, and the simulation feature signals are fed back to the step S1 to form a system loop. Defect tracking data is derived through multi-physics simulations, and a processing system and materials are optimized on the basis of the defect tracking data, thereby accurately controlling the quality and performance of the additive manufactured parts from a first nature principle, reducing the number of experimental trials and errors, and improving the working efficiency.

Herein, the simulation results obtained in the step S6 are the data (such as, the process parameters and the material properties) used by the multi-physics simulation system (MSS) during simulation of the processes of the nucleation/growth/phase change/texture process, the deformation/cracking/incomplete melting process, the process of changes in a temperature field cooling rate, the process of changes in morphology and texture, and the process of changes in intensity/residual stress, etc., as well as defect data and process data obtained after completion of the simulation, such as the magnitude of porosity, the residual stresses in the parts, the microstructure, the temperature field cooling rate, the morphology and the texture, and the intensity of the parts. The process data is the data that may indirectly lead to defects rather than directly represent defects.

Defect tracking is the inverse of the cause on the basis of the defects. A first nature principle is a research method and idea that emphasize the gradual derivation of complex phenomena and conclusions from the most basic, non-simplified principles.

The forgoing embodiments only express a plurality of embodiments of the present invention, and the description was relatively specific and detailed, but it should not be understood as a limitation to the patent scope of the present invention. It should be noted that for those of ordinary skill in the art, several modifications and improvements can be made without departing from the concept of the present invention and these modifications and improvements should all fall within the protection scope of the present invention. Therefore, the protection scope of the present invention shall be subject to the appended claims.

The invention claimed is:

1. A method for constructing a digital twin system for an additive manufacturing process with lifecycle data management, comprising the following steps:
    S1: constructing a Data Acquisition And Supervisory Control System (DASCS), which is operatively connected to additive manufacturing equipment, acquiring data through a multi-source sensor to obtain real-time manufacturing process data, and obtaining a mapping relationship between process parameters and acquired data, and microscopic image features through a deep learning network unit, wherein the real-time manufacturing process data comprises ultrasonic signals of cracks, spatter images for a molten pool, and melt track temperature;
    S2: constructing a defect prediction model by using an existing historical process parameter defect library and combining the mapping relationship and the microscopic image features, forming a Data Management and Storage System (DMSS), wherein the defect prediction model interacts with the additive manufacturing process by making a decision on the basis of anomalies between historical data and real-time data, and outputting control parameters to a Manufacturing Executing System (MES), wherein the control parameters comprises a laser voltage, a galvanometer deflection angle, a galvanometer deflection target value, and a galvanometer deflection speed;
    S3: constructing the MES for additive manufacturing equipment, receiving the control parameters and dynamically adjusting process settings of the additive manufacturing equipment based on the control parameters, executing a corresponding action instruction in the decision, and providing feedback to the DMSS;
    S4: establishing a digital model as a mapping model for the manufacturing executing system according to the MES, and setting a Configuration Model (CM) to configure parameters for the digital model by referring to the MES;
    S5: constructing a Simulation System (SS), performing data coupling on the data in S2, performing intra-module simulation and inter-module simulation, evaluating simulation results, making a decision based on the results obtained from an experimental model which is established by combing the historical data in S2, exchanging data and performing data coupling with the DMSS through a Virtual Reference Feedback Tuning (VRFT) parameter update algorithm;
    S6: on the basis of a simulation system raised by the SS, constructing a Multi-physics Simulation System (MSS) to simulate processes of the additive manufacturing process comprising a nucleation/growth/phase change/texture, a deformation/cracking/incomplete melting, a process of changes in a temperature field cooling rate, a process of changes in morphology and texture, and a process of changes in intensity/residual stress; and
    S7: on the basis of the simulation results in S6, obtaining quality and performance situations of additive manufactured and processed parts under different process parameters and material properties, and generating updated control decisions and feeding them back to S1 to form a system loop.

2. The method for constructing a digital twin system for an additive manufacturing process with lifecycle data management according to claim 1, wherein the multi-source sensor in S1 comprises an optical microphone, a radiography camera, a high-speed camera, and a spectrometer.

3. The method for constructing a digital twin system for an additive manufacturing process with lifecycle data management according to claim 1, wherein the microscopic image features in S1 comprise appearance time and appearance frequency features of the ultrasonic signals of cracks, spatter angle and speed features of the molten pool, and the maximum value and distribution features of the melt track temperature.

4. The method for constructing a digital twin system for an additive manufacturing process with lifecycle data management according to claim 3, wherein inputting extracted features and corresponding process parameters into an optimized LeNet-5 network to obtain a mapping relationship between the process parameters and the data acquired by the sensor, as well as an intrinsic connection of multi-source signals, as a data basis for a digital twin;

an optimization process for the LeNet-5 network comprises:
1) Adding a Based model benchmark network structure;
2) Replacing a standard convolution in the sixth convolutional layer with a depthwise separable convolution;
3) Using average pooling instead of a fully connected layer;
4) Adding a batch normalization layer before an activation function of each convolutional layer; and
5) Adding L2 regularization and Dropout terms to the fully connected layer.

5. The method for constructing a digital twin system for an additive manufacturing process with lifecycle data management according to claim 1, wherein in S2, a physical space and a virtual space of the digital twin system achieve bi-directional data flow within the DMSS; and a communication unit achieves data connection between the DASCS and the MSS through a multi-interface protocol, and a physical unit consisting of multiple sensors in additive manufacturing is mirrored to a cloud; and the cloud manages and synchronizes timeline information of a data space and a physical space to ensure simulation accuracy of physical information during synchronization and running.

6. The method for constructing a digital twin system for an additive manufacturing process with lifecycle data management according to claim 1, wherein in S3, after the MES executes instructions, corresponding changes in controller parameters are fed back to the DMSS, and uploaded to a cloud, and a process parameters-defect-microstructure library is updated in real time.

7. The method for constructing a digital twin system for an additive manufacturing process with lifecycle data management according to claim 1, wherein in S4, a digital twin model in the CM comprises a powder bed model, a scraper model, a laser model, and a blowing/atmospheric circulation model.

8. The method for constructing a digital twin system for an additive manufacturing process with lifecycle data management according to claim 1, wherein in S5, the intra-module simulation is temperature field simulation, and the inter-module simulation is stress field simulation and phase field simulation.

9. The method for constructing a digital twin system for an additive manufacturing process with lifecycle data management according to claim 1, wherein in S6, input parameters used by the MSS during simulation of the same batch are the same process parameters and material properties.

10. The method for constructing a digital twin system for an additive manufacturing process with lifecycle data management according to claim 1, wherein in S5, the VRFT parameter update algorithm is:

$$x_{k+1}=x_k+f(x_k,u_k+v_k)\cdot T;$$

wherein $x_{k+1}$ represents an intermediate predicted value of the microscopic image features at step k+1, $x_k$ represents a state vector of the microscopic image features at step k, f( ) represents a computational fluid dynamics model, a fluid-solid coupling model and a phase field model of the multi-physics simulation system MSS, $u_k$ represents a control variable of the process parameters at step k, $v_k$ represents a feature signal at step k, and T represents a sampling period;

$$y_{k+1}=n_{k+1}+h(x_{k+1},f(x_k,u_k+v_k)\cdot T);$$

wherein $y_{k+1}$ represents a predicted value, $n_{k+1}$ represents a measurement feature signal at step k+1, and h( ) represents a data learning model.

* * * * *